(12) United States Patent
Sedeffow (10) Patent No.: US 8,769,042 B2
(45) Date of Patent: Jul. 1, 2014

(54) DELIVERING A FILE

(75) Inventor: Peter Vassilev Sedeffow, London (GB)

(73) Assignee: Saffron Digital Limited, London (GB)

( * ) Notice: Subject to any disclaimer, the term of this patent is extended or adjusted under 35 U.S.C. 154(b) by 31 days.

(21) Appl. No.: 13/226,833

(22) Filed: Sep. 7, 2011

(65) Prior Publication Data
US 2012/0059904 A1   Mar. 8, 2012

(30) Foreign Application Priority Data

Sep. 8, 2010   (GB) .................................. 1014878.1

(51) Int. Cl.
*G06F 15/16*   (2006.01)
(52) U.S. Cl.
USPC ........................... 709/217; 709/203; 709/218
(58) Field of Classification Search
USPC ................................................ 709/217, 218
See application file for complete search history.

(56) References Cited

U.S. PATENT DOCUMENTS

| 6,345,279 | B1 | 2/2002 | Li et al. | |
|---|---|---|---|---|
| 2002/0156842 | A1* | 10/2002 | Signes et al. | 709/203 |
| 2004/0039796 | A1* | 2/2004 | Watkins | 709/218 |
| 2006/0168118 | A1 | 7/2006 | Godlin et al. | |
| 2010/0205147 | A1 | 8/2010 | Lee | |

FOREIGN PATENT DOCUMENTS

| WO | 2004/015896 A1 | 2/2004 |
|---|---|---|
| WO | 2010/094927 A1 | 8/2010 |

* cited by examiner

*Primary Examiner* — Yves Dalencourt
(74) *Attorney, Agent, or Firm* — Harness, Dickey & Pierce, P.L.C.

(57) ABSTRACT

A method and apparatus delivers a file from a content provider to a requesting client. A request from a client to access a file is received, a common file that is common to all requesting clients is identified in a first storage location, in a second storage location a personalized file that is unique to said client is identified, the common file and are personalized file are analyzed to find their differences, the shared data and the unique data are delivered to the client and the client is instructed to stitch the shared data and the unique data together.

19 Claims, 6 Drawing Sheets

DELIVERING A FILE

CROSS REFERENCE TO RELATED APPLICATIONS

This application claims priority from United Kingdom Patent Application No. 10 14 878.1, filed Sep. 8, 2010, the entire disclosure of which is incorporated herein by reference in its entirety.

BACKGROUND OF THE INVENTION

1. Field of the Invention

The present invention relates to an apparatus and a method for delivering personalised files to users using a content delivery network.

2. Description of the Related Art

Content delivery networks are used to maximise bandwidth for accessing data by distributing copies of the data amongst several strategically placed nodes. This can result in an increase in the ability of a content provider to serve concurrent users, whilst reducing bandwidth costs.

A problem is encountered when a content provider wishes to provide a personalised file to a unique user. As the copies of files stored within a content delivery network must be identical and distributable to any user, there is no scope for storing a personalised file for each unique user. A solution is required that allows the delivery of personalised files, but retains the strengths of a content delivery network in respect of performance and cost advantages.

BRIEF SUMMARY OF THE INVENTION

According to an aspect of the present invention, there is provided a method comprising delivering a file from a content provider to any one of a plurality of clients, said method including steps of receiving a request from a first one of said plurality of clients to access a file, identifying in a first storage location a common file that is common to each one of said plurality of clients, identifying in a second storage location a personalised file that is unique to said first one of said plurality of clients, analysing said common file and said personalised file to identify their differences, thereby identifying portions of shared data in said common file and portions of unique data in said personalised file, delivering to said first one of said plurality of clients said shared data and said unique data, and instructing said first one of said plurality of clients to stitch said shared data and said unique data together, so as to create a local personal file for use only by said first one of said plurality of clients.

According to another aspect of the present invention, there is provided an apparatus for delivering a file from a content provider to any one of a plurality of clients, comprising a processor, memory, storage and a network interface, wherein said processor is configured to receive, via said network interface, a request to access a file from a first one of said plurality of clients, identify in a first storage location a common file, said common file being common to each one of said plurality of clients, identify in a second storage location a personalised file, said personalised file being unique to said first one of said plurality of clients, analyse said common file and said personalised file to find their differences, thus identifying portions of shared data in said common file and portions of unique data in said personalised file, deliver to said first one of said plurality of clients said shared data and said unique data using said network interface, and issue instructions to said first one of said plurality of clients to stitch said shared data and said unique data together using said network interface, so as to create a local personal file for use only by said first one of said plurality of clients.

According to a further aspect of the present invention, there is provided a non-transitory computer-readable medium encoded with program instructions executable by a computer that, when executed by a computer, cause a computer to deliver a file from a content provider to any one of a plurality of clients by performing steps of receiving a request from a first one of said plurality of clients to access a file, identifying in a first storage location a common file that is common to each one of said plurality of clients, identifying in a second storage location a personalised file that is unique to said first one of said plurality of clients, analysing said common file and said personalised file to identify their differences, thereby identifying portions of shared data in said common file and portions of unique data in said personalised file, delivering to said first one of said plurality of clients said shared data and said unique data, and instructing said first one of said plurality of clients to stitch said shared data and said unique data together, so as to create a local personal file for use only by said first one of said plurality of clients.

DETAILED DESCRIPTION OF EXAMPLE EMBODIMENTS

Figure 1:
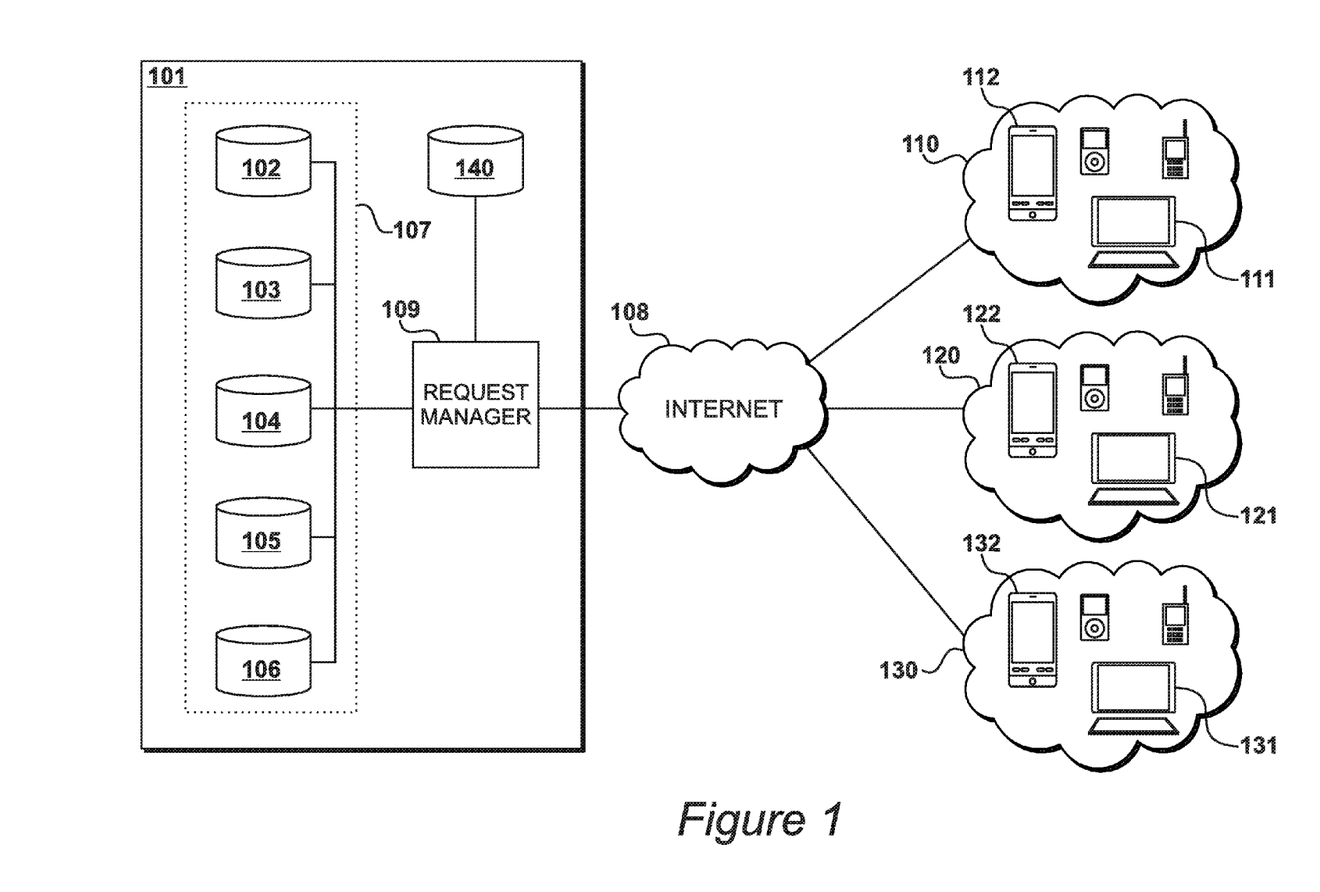
FIG. 1 shows an environment in which the present invention may be deployed.

FIG. 1

An environment in which the present invention may be implemented is illustrated in FIG. 1.

A content provider 101 stores common versions of files at various locations 102, 103, 104, 105 and 106. These locations usually comprise large server pools configured to provide a high level of bandwidth for accessing content, and, in combination, form a first storage location, in this case content delivery network 107, which is connected to the Internet 108. At each location 102 to 106, the common files are substantially the same, thus distributing copies of data over a large geographical area. By distributing the data in this way, content provider 101 is not reliant upon one single server pool to provide access it its content. Additionally, spreading the data out over a large area reduces the amount of bandwidth required to service the sending of any one file in a particular server pool to clients.

Clients, such as those found in groups 110, 120 and 130, may request the sending of data held by the content provider over the Internet 108. Requests from the clients are received by a request management system 109 networked within content provider 101. Incoming requests from groups 110, 120 and 130 are handled by a request management system 109. Request management system 109 is used to locate content on content delivery network 107 and deliver it to its requesting client.

Groups 110, 120 and 130 typically comprise large numbers of clients clustered in a particular geographical area. Thus, group 110 may be located in Europe, group 120 in North America and group 130 in Asia.

When all of the clients requesting data use substantially the same platform to view files, such as personal computers 111, 121 and 131 running the Microsoft® Windows™ operating system in combination with Windows™ Media Player, then all of the copies of files stored by the content delivery network 107 can be identical. However, other types of clients, such as 3G smartphones 112, 122 and 132 may require copies of the file that are tailored to their platform, such as the Google® Android™ operating system.

Furthermore, each unique client requesting data may require a unique file personalised solely for them, due to factors such as device type, age restrictions, location, time limits on storing the file and so on. Current content delivery systems are not able to provide this personalisation, as by their nature the files they store must be substantially the same.

The present invention overcomes this problem within the framework of a content delivery network 107 by adding a second storage location, in this case file store 140, to content provider 101. File store 140 is, as with locations 102 to 106, a large server pool. File store 140 holds copies of the common files stored on the content delivery network 107 that have been personalised for each unique client so as to create personalised versions of the files. The process of personalisation of the common files to produce personalised files will be discussed below with reference to the Figures.

Figure 2:
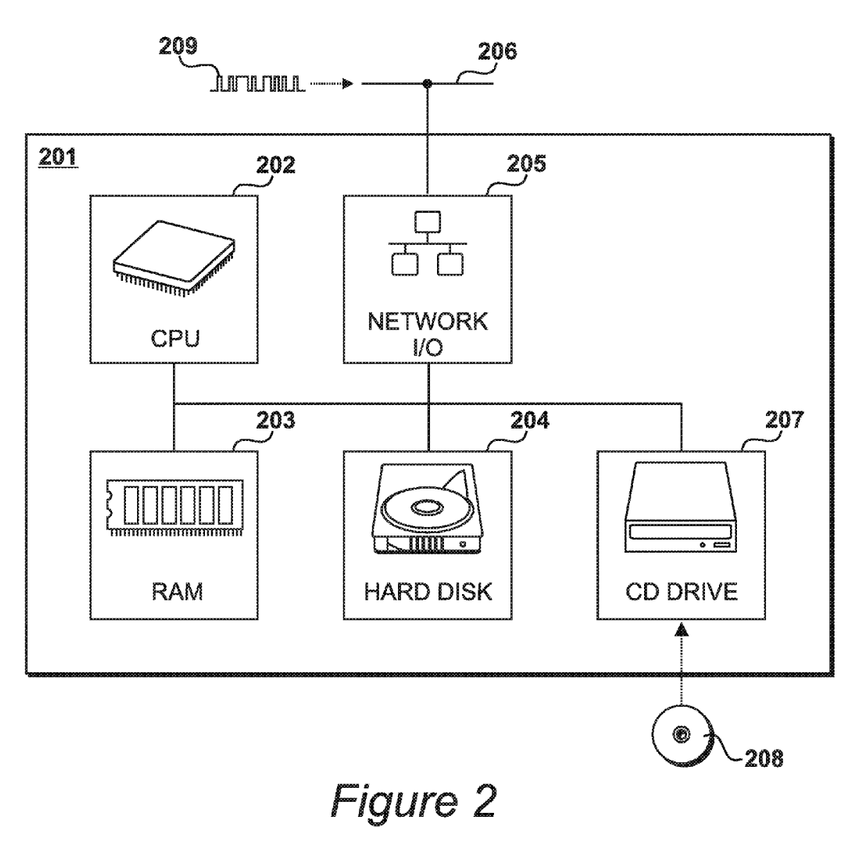
FIG. 2 shows an apparatus for implementing the present invention.

FIG. 2

Components within request management system 109 are shown in FIG. 2.

In this particular example, request management system 109 is provided by a single request manager 201, but in other examples it is likely that clusters of request managers would be used to deal with high numbers of requests. Indeed, a large number of clusters spread over different physical sites may be employed to add redundancy.

Request manager 201 includes a processing device provided by a CPU 202, memory provided by RAM 203, storage provided by hard disk drive 204 and a network interface provided by an interface card 205. In an example, CPU 202 is an Intel® Xeon® processor, RAM 203 is 8-gigabytes of DDR3 random access memory, and hard disk drive 204 is a 146-gigabyte serial attached storage hard disk drive. Network interface 205 allows request manager 201 to connect to an internal network 206 installed at content provider 101, and also to the Internet 108 via a gateway (not shown).

Request manager 201 also comprises an optical drive 207, such as a CD-ROM drive, into which an optical disk, such as CD-ROM 208 may be inserted. CD-ROM 208 comprises instructions for implementing the personalisation functionality that are installed on hard disk drive 204, loaded into memory 203 and executed by processor 202. Alternatively, the instructions (illustrated as 209) may be transferred from a network location over internal network 206 using network interface 205.

Figure 3:
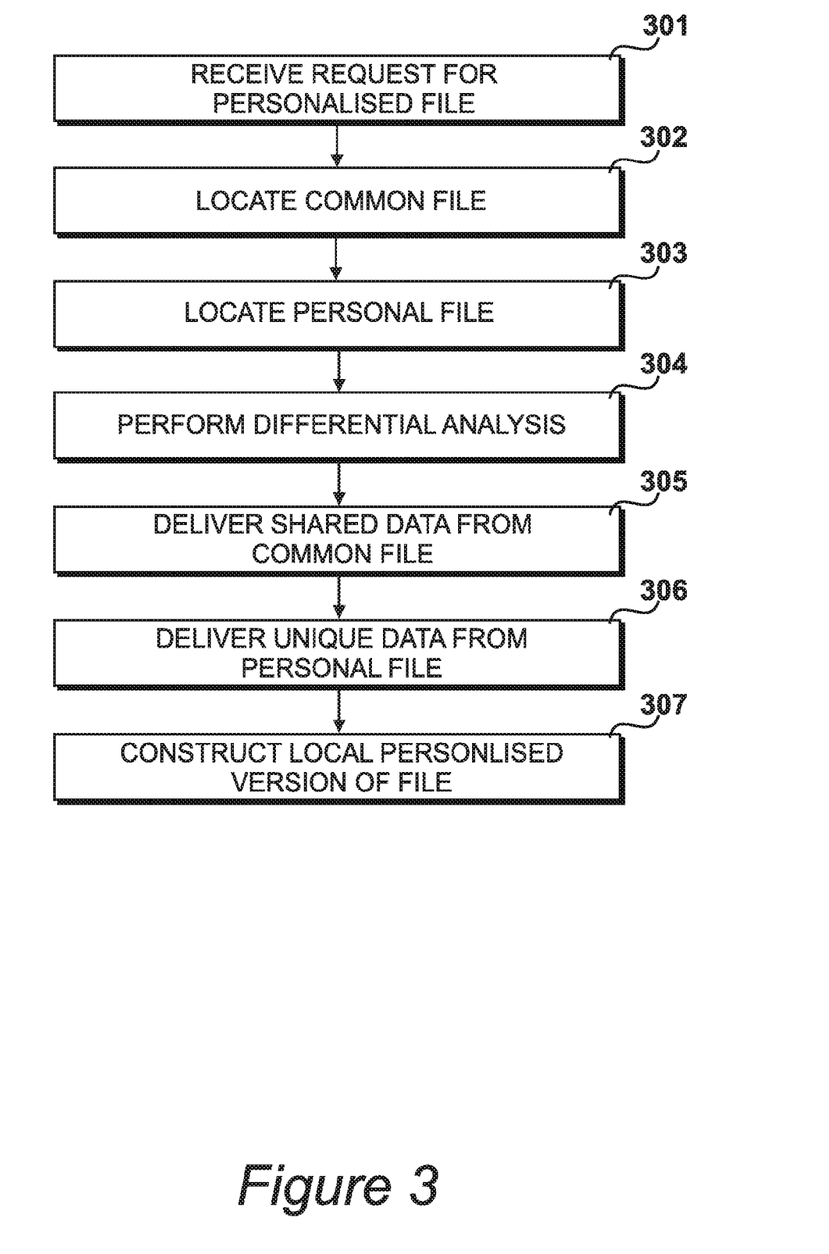
FIG. 3 shows steps carried out to construct a local personalised file on a client device.

FIG. 3

Steps carried out to construct a local personalised file on a client device are shown in FIG. 3.

At step 301, content provider 101 receives a request from a client, say personal computer 111, to access a file on content delivery network 107. This request includes data that requires that the file be personalised for the particular user. In an example, the user is requesting a film, and requires personalisation to censor profanities in the film's audio track.

At step 302, request management system 109 locates the common file in a location within content delivery network 107 that is nearest to the requesting client, for example location 102. At step 303, the personalised file is located on file store 140. In this example, file store 140 is located much further from the requesting client, and is serving a larger number of concurrent clients than location 102. Thus, its available bandwidth is much lower than that at location 102.

In order to reduce the amount of data needing to be transferred from file store 140 to personal computer 111 via the Internet 108, request management system 109 performs a differential analysis upon the common file stored at location 102 and the personalised file stored at file store 140 at step 304. This process will be discussed further with reference to FIG. 4. This results in the difference between the common and the personalised file being identified, and only the unique portions of the personalised file need be downloaded by personal computer 111 from file store 140.

Thus, at step 305, the shared data is delivered by location 102 to personal computer 111, whilst the unique data is delivered at substantially the same time by file store 140 to personal computer 111 at step 306.

Upon completion of steps 305 and 306, personal computer 111 is instructed by request management system 109 to stitch the shared data and the unique data together to reproduce the personalised file as a local personalised file.

In an alternative embodiment, the shared data and the unique data are delivered sequentially and in order. In this case, personal computer stitches each portion of shared data and each portion of unique data together in real time as they are received. This procedure is especially suited to a situation where a personalised file is being streamed to a client.

Figure 4:
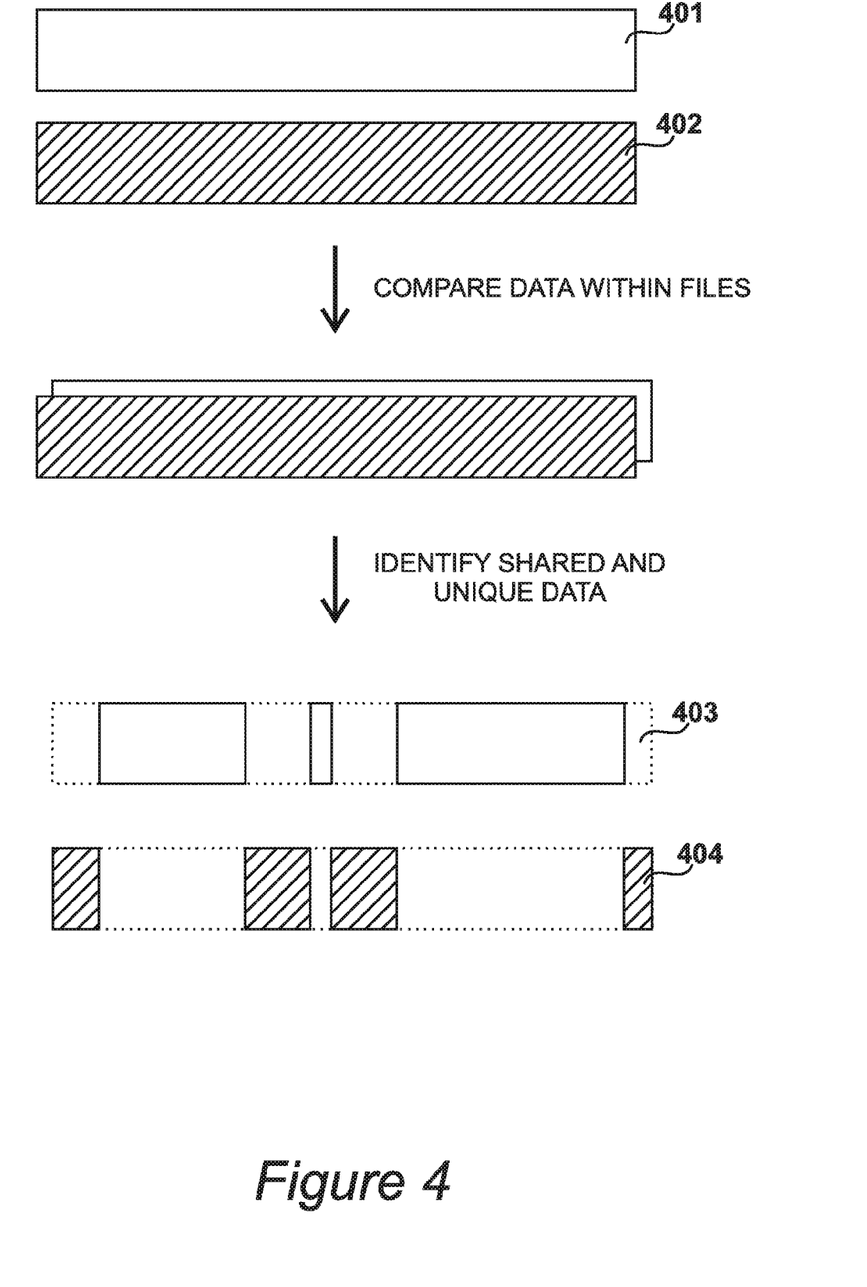
FIG. 4 illustrates operations carried out during step 304.

FIG. 4

Operations carried out during step 304 are illustrated in FIG. 4.

Request management system 109 locates at steps 302 and 303 the common file 401 and the personalised file 402. It then proceeds to compare the data contained within the files through a process of differential analysis, which results in the identification of shared data 403 that is common to both common file 401 and personalised file 402, along with unique data 404 that is only found in personalised file 402. This allows request management system 109 to establish download patterns that describe the portions of the shared file 401 and personalised file 402 that need to be delivered to the client. This procedure will be described further with reference to FIGS. 5 and 6.

Figure 5:
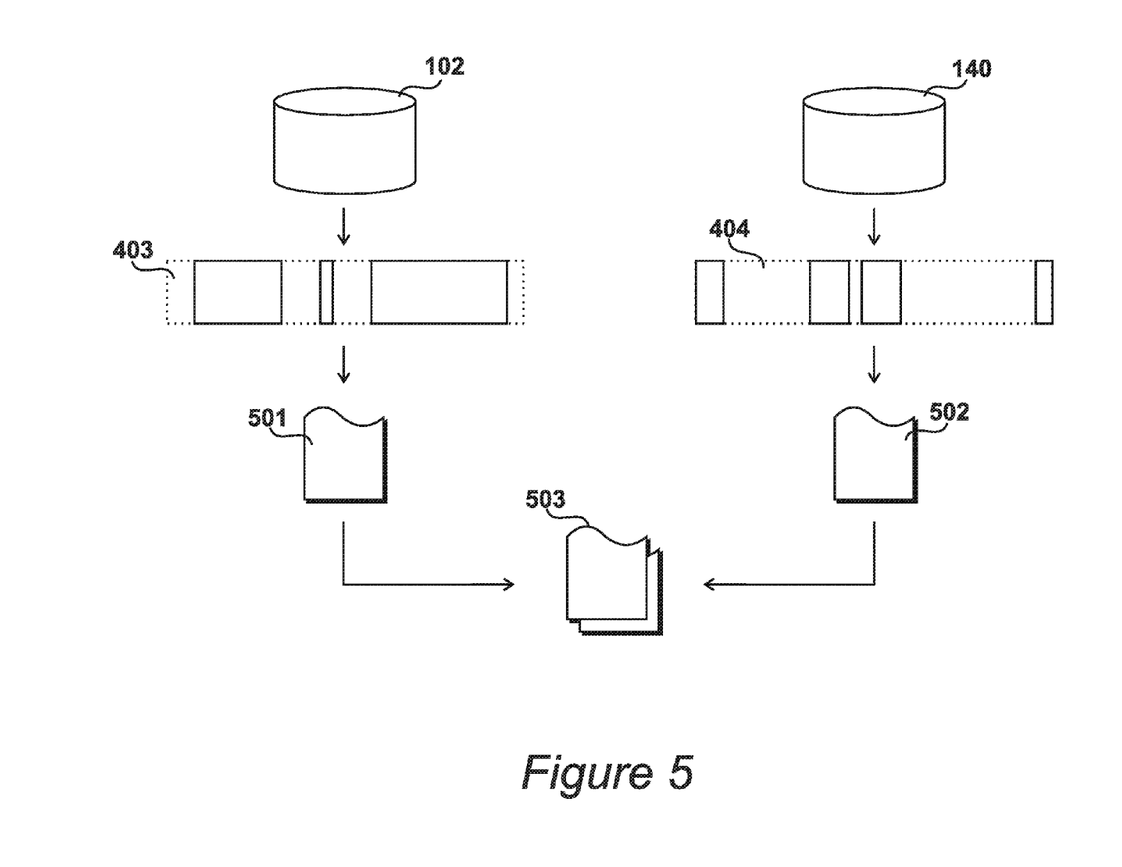
FIG. 5 illustrates a procedure for allowing a download of a personalised file.

FIG. 5

The use of the download patterns in an embodiment where the requested file is downloaded is illustrated in FIG. 5.

In a download situation, the client must wait for all the data to arrive before accessing the delivered, personalised file. Thus, the data for delivery from location 102 and file store 140 is first located and then delivered simultaneously to the client into a local shared file 501 and a local personalised file 502. When the delivery is complete, the local personalised file 503 may be constructed by stitching together the data.

Thus, the unique data 404 is delivered to the client even when file store 140 is experiencing a bandwidth shortage, as the amount of data required from file store 140 is only the data that is unique to the personalised file.

Figure 6:
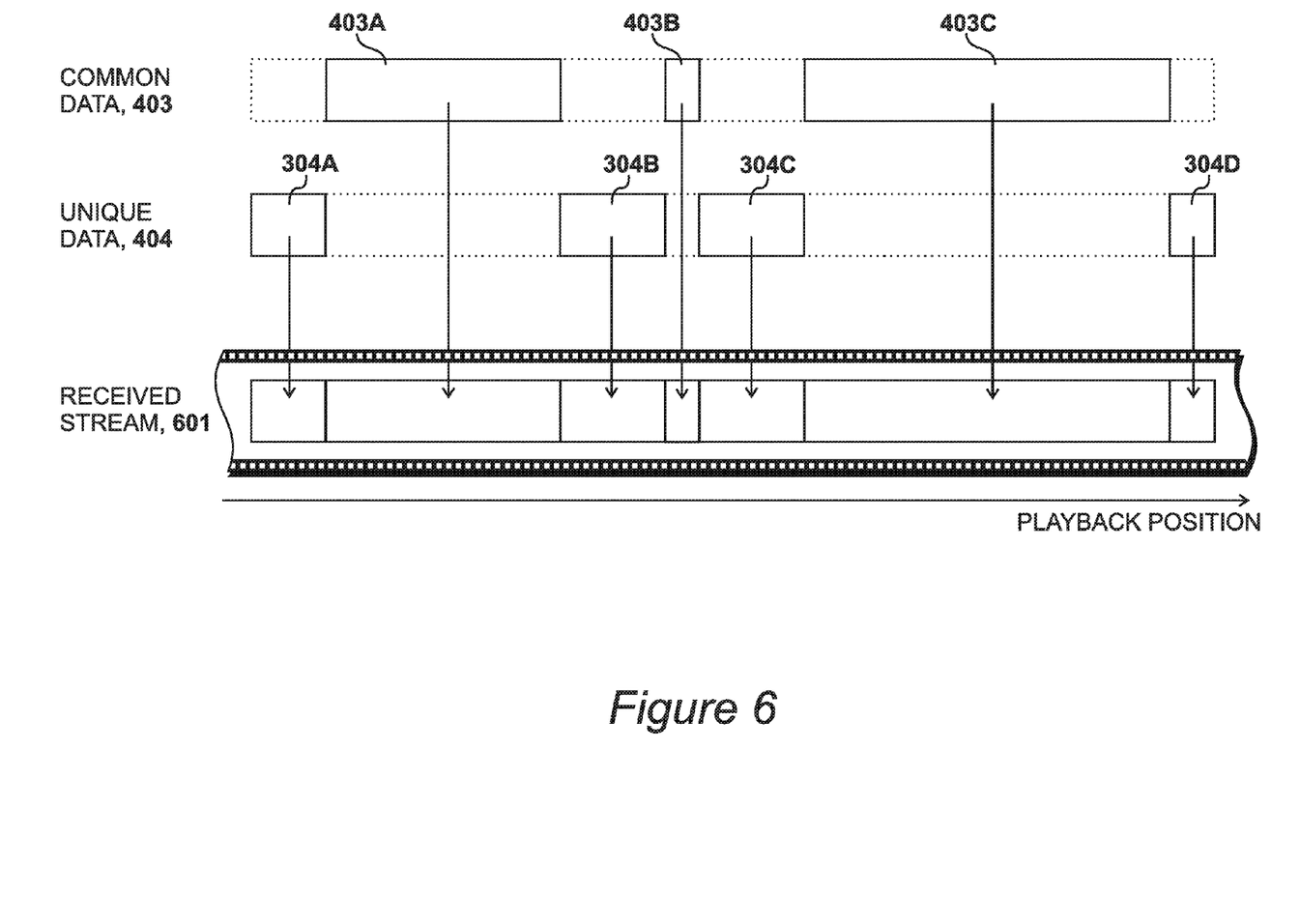
FIG. 6 illustrates a procedure for streaming a personalised file.

FIG. 6

A procedure for streaming a personalised file, such as a film, is illustrated in FIG. 6.

The identification of shared and unique portions allows content provider 101 to establish file delivery patterns of the common file 401 and personalised file 402 such that streaming of the file can take place. This is especially suitable when the client is requesting a film from content provider 101, and does not wish to wait for the entire file to download before commencing playback.

In this particular example, there are three portions of common data 403A, 403B and 403C, whilst there are four portions of unique data 404A, 404B, 404C and 404D that have been identified. Thus, the streaming of the file from content provider 101 to the client begins with the delivery and commencement of playback of portion 404A from file store 140, followed by the delivery and playback of portion 403A from location 102 and so on. Thus, the portions of data are delivered sequentially and in order. Each portion is delivered consecutively and produces a received stream 601, which is displayed by the client to a user.

I claim:

1. A method comprising delivering a file from a content provider to any one of a plurality of clients, said method including steps of:
receiving a request from a first one of said plurality of clients to access a file;
identifying in a first storage location a common file that is common to each one of said plurality of clients;
identifying in a second storage location a personalized file that is unique to said first one of said plurality of clients, wherein said personalized file is a personalized version of said common file that differs in a number of portions from said common file;
analyzing said common file and said personalized file to identify their differences, thereby identifying portions of shared data that are common to both said common file and said personalized file, and portions of unique data that are found only in said personalized file;
selecting said portions of shared data from said common file and said portions of unique data from said personalized file;
subsequent to said analyzing and selecting steps, delivering to said first one of said plurality of clients said shared data and said unique data; and
instructing said first one of said plurality of clients to stitch said shared data and said unique data together, so as to create a local personal file for use only by said first one of said plurality of clients, wherein said local personal file is identical to said personalized file.

2. A method according to claim 1, wherein said portions of shared data and said portions of unique data are delivered to said first one of said plurality of clients substantially simultaneously.

3. A method according to claim 2, wherein said delivering of portions of shared data and portions of unique data is performed when one of said plurality of clients requests to download a file.

4. A method according to claim 1, wherein said portions of shared data and said portions of unique data are delivered to said first one of said plurality of clients sequentially and in order.

5. A method according to claim 4, wherein said delivering of portions of shared data and portions of unique data is performed when one of said plurality of clients requests to stream a file.

6. A method according to claim 1, wherein said first storage location comprises a content delivery network.

7. A method according to claim 1, wherein said second storage location comprises a file store.

8. An apparatus for delivering a file from a content provider to any one of a plurality of clients, comprising a processor, memory, storage and a network interface, wherein said processor is configured to:
receive, via said network interface, a request to access a file from a first one of said plurality of clients;
identify in a first storage location a common file, said common file being common to each one of said plurality of clients;
identify in a second storage location a personalized file, said personalized file being unique to said first one of said plurality of clients, wherein said personalized file is a personalized version of said common file that differs in a number of portions from said common file;
analyze said common file and said personalized file to find their differences, thus identifying portions of shared data that are common to both said common file and said personalized file, and portions of unique data that are found only in said personalized file;
select said portions of shared data from said common file and said portions of unique data from said personalized file;
subsequent to analyzing said common file and said personalized file and selecting said shared data and said unique data, deliver to said first one of said plurality of clients said shared data and said unique data using said network interface; and
issue instructions to said first one of said plurality of clients to stitch said shared data and said unique data together using said network interface, so as to create a local personal file for use only by said first one of said plurality of clients, wherein said local personal file is identical to said personalized file.

9. An apparatus according to claim 8, wherein said processor is further configured to deliver, using said network interface, said portions of shared data and said portions of unique data to said first one of said plurality of clients substantially simultaneously.

10. An apparatus according to claim 9, wherein said processor is configured to deliver said portions of shared data and said portions of unique data substantially simultaneously when one of said plurality of clients requests to download a file.

11. An apparatus according to claim 8, wherein said processor is further configured to deliver, using said network interface, said portions of shared data and said portions of unique data to said first one of said plurality of clients sequentially and in order.

12. An apparatus according to claim 11, wherein said processor is configured to deliver said portions of shared data and said portions of unique data sequentially and in order when a client requests to stream a file.

13. An apparatus according to claim 8, wherein said first storage location comprises a content delivery network.

14. An apparatus according to claim 8, wherein said second storage location comprises a file store.

15. A non-transitory computer-readable medium encoded with program instructions executable by a computer that, when executed by a computer, cause a computer to deliver a file from a content provider to any one of a plurality of clients by performing steps of:
receiving a request from a first one of said plurality of clients to access a file;
identifying in a first storage location a common file that is common to each one of said plurality of clients;
identifying in a second storage location a personalized file that is unique to said first one of said plurality of clients, wherein said personalized file is a personalized version of said common file that differs in a number of portions from said common file;

analyzing said common file and said personalized file to identify their differences, thereby identifying portions of shared data that are common to both said common file and said personalized file, and portions of unique data that are found only in said personalized file;

selecting said portions of shared data from said common file and said portions of unique data from said personalized file;

subsequent to said analyzing and selecting steps, delivering to said first one of said plurality of clients said shared data and said unique data; and instructing said first one of said plurality of clients to stitch said shared data and said unique data together, so as to create a local personal file for use only by said first one of said plurality of clients, wherein said local personal file is identical to said personalized file.

16. A non-transitory computer-readable medium according to claim 15, further encoded with program instructions that, when executed by a computer, cause a computer to deliver said portions of shared data and said portions of unique data to said first one of said plurality of clients substantially simultaneously.

17. A non-transitory computer-readable medium according to claim 15, further encoded with program instructions that, when executed by a computer, cause a computer to deliver said portions of shared data and said portions of unique data substantially simultaneously when one of said plurality of clients requests to download a file.

18. A non-transitory computer-readable medium according to claim 15, further encoded with program instructions that, when executed by a computer, cause a computer to deliver said portions of shared data and said portions of unique data to said first one of said plurality of clients sequentially and in order.

19. A non-transitory computer-readable medium according to claim 15, further encoded with program instructions that, when executed by a computer, cause a computer to deliver said portions of shared data and said portions of unique data sequentially and in order when one of said plurality of clients requests to stream a file.

* * * * *